United States Patent [19]

Van Denberg

[11] 4,166,640
[45] Sep. 4, 1979

[54] AXLE SUSPENSION FOR WHEELED VEHICLES

[75] Inventor: Ervin K. Van Denberg, Muskegon, Mich.

[73] Assignee: Turner Quick-Lift Corporation, Canton, Ohio

[21] Appl. No.: 896,129

[22] Filed: Apr. 14, 1978

[51] Int. Cl.² ............................................. B60G 13/02
[52] U.S. Cl. .................................. 280/711; 267/54 R
[58] Field of Search ...................... 280/711, 712, 713; 267/15 R, 18, 54 R

[56] References Cited

U.S. PATENT DOCUMENTS

| | | | |
|---|---|---|---|
| 3,140,880 | 7/1964 | Masser | 280/713 |
| 3,332,701 | 7/1967 | Masser | 280/713 |
| 3,482,854 | 12/1969 | Masser | 280/713 |
| 3,547,215 | 12/1970 | Bird | 180/71 |
| 3,751,066 | 8/1973 | Narahari | 280/712 |
| 3,785,673 | 1/1974 | Harbers, Jr. et al. | 280/712 |

Primary Examiner—Joseph E. Peters, Jr.
Assistant Examiner—Michael Mar
Attorney, Agent, or Firm—Geoffrey R. Myers

[57] ABSTRACT

An axle suspension particularly applicable to trailers includes an elongated, substantially rigid beam, a pneumatic bellows located at one end of the beam, a hanger bracket located at the other end of the beam, an axle connecting means rigidly connected to the beam and axle, and an elastomeric bushing structure located at or near the pivot connection between hanger bracket and beam which has a different degree of deflection beamwise than hangerwise, is sufficiently rigid to provide suspension stability and is sufficiently resilient to allow operative deflections in response to articulations of the suspension to maintain substantially constant the distance between the hanger bracket and the axle connecting means.

24 Claims, 10 Drawing Figures

AXLE SUSPENSION FOR WHEELED VEHICLES

This invention relates to axle suspension systems for wheeled vehicles. More particularly this invention relates to improved suspensions of the rigid beam type wherein airbags are employed so as to render the suspension an air suspension.

Axle suspensions of the rigid beam type employing airbags have been known for many years in the truck and trailer industry. Their advantages, such as stability and ride comfort, are well known.

Generally speaking, these suspensions include an elongated, substantially rigid beam, pneumatic (air) bellows (bags) located at one end of the beam, a hanger bracket located at the other end of the beam, means for pivotally connecting the hanger bracket to the beam and means for connecting an axle to the beam located intermediate the ends of the beam. In some instances, the beam is located in a posture such that the hanger bracket is in the forward direction (e.g. the direction of forward vehicle travel) and the pneumatic bellows are in the rearward direction on the beam. When such a posture is present, the suspension is popularly referred to as a "trailing beam" or "trailing arm" suspension.

Any suspension employed on a truck or trailer should be as safe, durable, and as economical as possible. Often these characteristics conflict and compete, thus usually necessitating a compromise one against the other in a given system; the net result often being less than that which is desired. For example, safety considerations dictate that the suspension be sufficiently rigid in its various planes, to maintain the line of travel of the vehicle. Safety also necessitates, however, that the suspension be sufficiently flexible or resilient so as to allow (i.e. take up) deflections caused by articulation forces experienced during operation of the vehicle. Durability includes the ability to resist degeneration (damage) which occurs from the deflections, and economy is that desirable characteristic which is denegrated by the cost involved in achieving safety and durability.

In some trailing arm suspensions heretofore employed, deflections are taken up by providing elastomeric bushings or blocks between the axle and the axle connector or between the axle connector and the beam. In order, then, to achieve rigidity, the pivot at the hanger-beam junction is maintained substantially rigid by the use of a radially uniform bushing which does not take up deflections to any substantial degree, makes no differentiation between deflections in the hangerwise vs. beamwise direction, nor does it vary the spring rates between the horizontal and vertical. In other words, the prior art devices of the rigid beam type seek to take up the deflections of the suspensions at the axle or axle-to-beam connection while achieving the necessary rigidity for stability and maintainance of non-steer characteristics by rigidifying the hanger-to-beam pivot connection.

In other suspensions, the rigid beams have been replaced by a flexible thin beam or leaf spring in an attempt to take up the deflections. The axle connection is then left unbushed in an attempt to achieve rigidity. A bushing is provided at times at the hanger-to-beam pivot, but it, like the rigid beam bushing, is relatively small and uniform circumferentially. Energy stored during vehicle roll is stored substantially in the deflections of this relatively flexible beam.

Unfortunately, neither of these suspensions optimally achieves its goal. In the known rigid beam suspensions for example, the elastomeric axle-to-beam elements are highly stressed and degradation occurs quickly necessitating frequent replacement, down time and loss of economy. As the system deteriorates and before replacement, furthermore, safety considerations begin to arise, specifically, vehicle lean or roll becomes excessive. In the flexible beam and leaf spring situations, rigidity, ride and durability questions arise. At times these flexible beam suspensions are rather heavy, thus detracting from available payload carrying capacity. Other known advantages achieved from the use of a rigid beam are also lost.

It is apparent from the above that there exists a need in the art for a suspension which overcomes or at least mitigates these problems and which provides a suspension that better optimizes the characteristics of safety, durability and economy. A purpose of this invention is to fulfill this and other needs in the art in a manner more apparent to the skilled artisan once given the following disclosure.

Generally speaking, this invention fulfills these needs by providing in an axle suspension system comprising an elongated, substantially rigid beam, a pneumatic bellows located at one end of the beam, a hanger bracket located at the other end of the beam, means for pivotally connecting the hanger bracket to the beam and means for connecting an axle to the beam located intermediate the ends of the beam, the improvement comprising, means for rigidly connecting the axle connecting means to the beam, the axle connecting means being capable of being rigidly connected to the axle thereby forming a rigid axle to beam connection, and an elastic means having a different degree of deflection beamwise than hangerwise, the elastic means being located at a spaced distance from the axle connecting means in the path of articulation forces between the beam and hanger bracket and being sufficiently resilient to allow operative deflections in response to the articulation forces and at the same time restrain longitudinal movement sufficiently to maintain substantially constant the distance between the hanger bracket and the axle connecting means.

In certain preferred embodiments the elastic means includes an elastomeric bushing arrangement located at or near the hanger-to-beam pivot connection. Such suspensions find unique application with non-powered axles and particularly as axle suspensions for tailers.

The preferred suspensions according to this invention offer the following advantages: good ride characteristics loaded or unloaded; good stability in all three modes; good durability; substantially constant ride height; easy axle alignment; good economy; high strength for safety and excellent braking characteristics. In fact, in many of the preferred embodiments the three factors of safety, economy and durability are optimized to an extent considerably higher than heretofore achieved in prior, known suspensions.

This invention will now be described with respect to certain embodiments thereof as illustrated in the accompanying drawings wherein:

Figure 1:
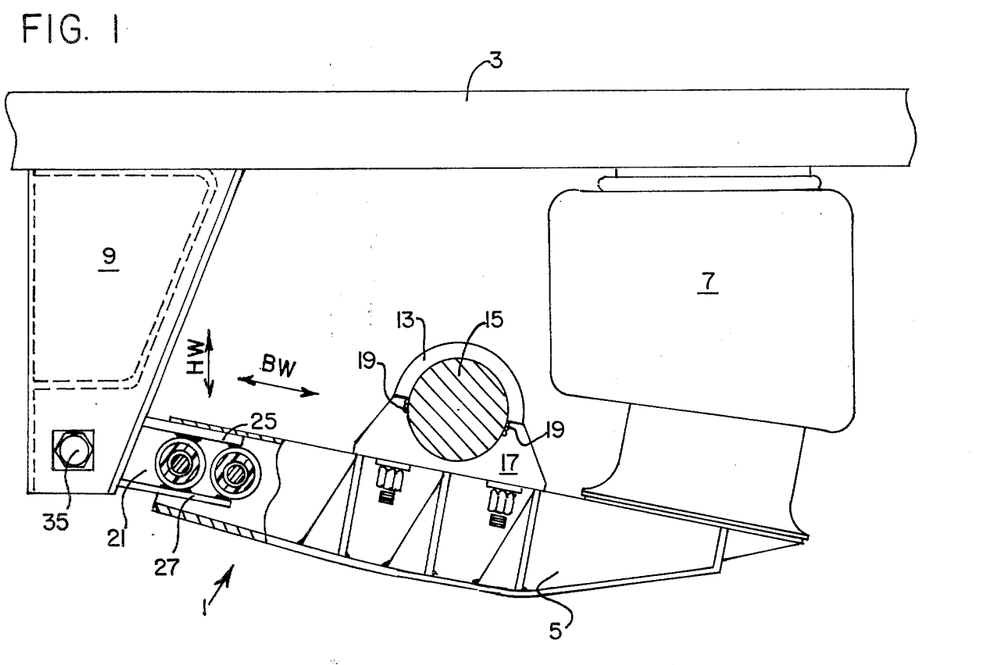
FIG. 1 is a side plan, partially sectionalized view of an axle suspension system according to this invention.

With reference to FIG. 1 there is illustrated a trailing arm suspension 1 connected to a trailer frame member 3. Suspension 1 includes a rigid trailing beam 5, airbag 7 at one end of beam 5, and hanger bracket 9 at the other end. Suspension 1 may be optionally provided with a conventional shock absorber (not shown) extending between beam 5 and frame 3. Located intermediate the ends of beam 5 is axle connection means 11. Means 11 are rigidly connected to beam 5 by U-bolts 13. Axle 15 resides in saddle members 17 and is welded via welds 19 to U-bolts 13. In this way axle 15 is rigidly connected to beam 5. Other means 11, such as those conventionally employed in the art may be used provided that they rigidly secure beams 5 to the axle 15.

In order to take up the deflections in suspension 1 caused by articulation forces during operation, there is provided at the hanger bracket end of beam 5 an elastic means 21 having a degree of deflection different in the beamwise direction BW than in the hangerwise direction HW. In this embodiment, the hangerwise HW deflection is greater than beamwise deflection BW and the spring rate is greater in the horizontal than in the vertical direction.

The actual absolute (i.e. specific) values of deflection and rates will vary depending upon several factors, the achievement of a difference being the generic consideration. For example, depending upon such considerations as type of vehicle, load to be carried, need for stability vs. ride comfort, geographical location to be driven over, and the like. Generally speaking, for this and the other embodiments hereinafter described, and when used for suspensions on trailers of the "tractor-trailer" type wherein the suspension is certified at about 18,000 lbs. or more GAWR, deflections per side on the order of about 0–0.19" for BW and about 1.63–1.25" for HW with a ratio per side of BW:HW of about 1:2 to 1:8 will usually achieve the desired results of this invention.

Figure 2:
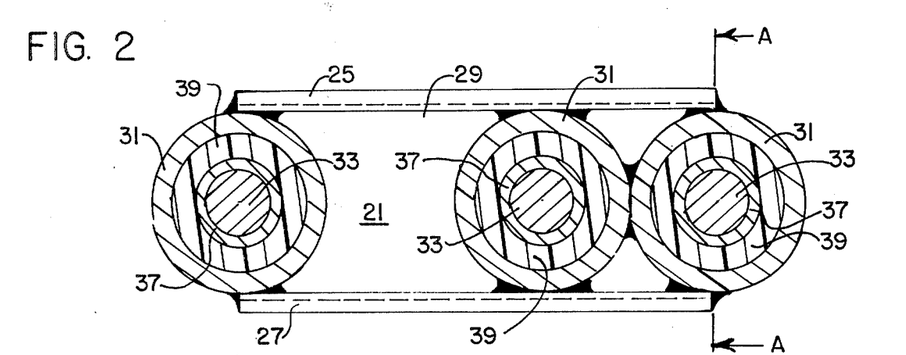
FIG. 2 is a side sectional view of the elastic bushing arrangement of FIG. 1.
Figure 3:
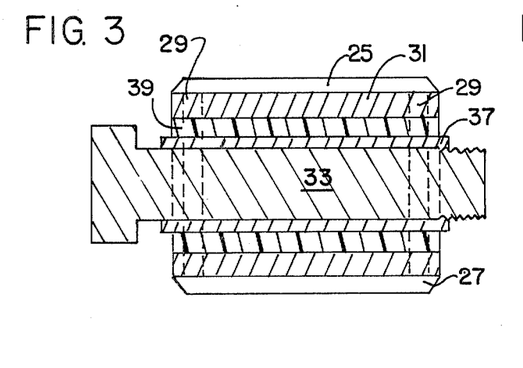
FIG. 3 is an end sectional view taken along line A—A of FIG. 2.
Figure 4:
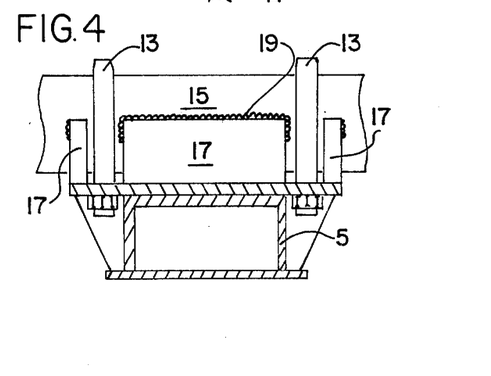
FIG. 4 is an end sectional view of the axle connection of FIG. 1.
Figure 5:
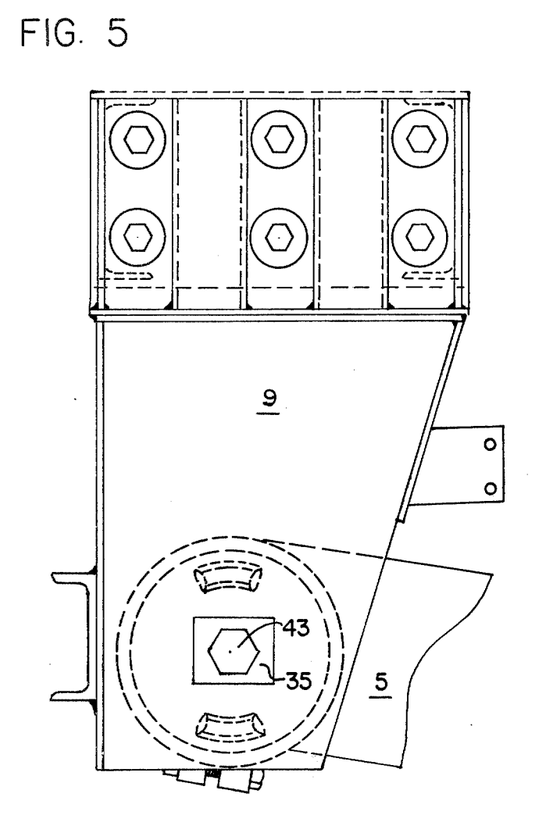
FIG. 5 is a side plan, partially invisible view of another embodiment of this invention.

With reference particularly to FIGS. 2–4, elastic means 21 includes a box member 23 comprised of upper flange 25, lower flange 27 and side webs 29 (dotted lines FIG. 3). Webs 29 are welded to flanges 25 and 27 and the outer surface of metal bushing rings 31. Extending through each of rings 31 located in beam 5 are pins 33 which extend through and across beam 5 as well. The other of the 3 rings 31 constitutes the pivot connection 35 and this pin 33 likewise extends across and through the side walls of hanger bracket 9.

Each pin 33 is encased in a metal sheath 37. Elastomeric bushings 39 are formed of material which is chemically bonded to the inner metal sheath 37 forming a Robertson type bushing. Bushings 39 are then pressure fit into rings 31. In preferred embodiments, sheath 38 is secured tightly by bolt 33 so that it does not rotate on pin 33, particularly at the pivot connection 35, such that virtually all pivotal movement about pin 33 (i.e. at least at the pivot pin 33) is within bushing 39. These bushings may be made of conventional elastomeric bushing material heretofore used for the bushings in the prior art. They may all be of substantially the same dimensions. However, because of the arrangement here shown of a series of bushing, rather than just a single one, located at or immediately adjacent the pivot connection, unique features are achieved. For example, in this way, the elastic means 21 has a different degree of deflection BW than HW, a different vertical than horizontal spring rate and is sufficiently resilient to allow operative deflections in response to articulation forces and at the same time is sufficiently rigid to restrain longitudinal movement thereby to maintain substantially constant the distance between the hanger bracket 9 and the axle connecting means 11.

By varying the bushing sizes and other parameters such as spacing, etc., to the desired degree, the vertical spring rate may be set to limit vehicle roll to approximately 3 degrees and the horizontal rate with radially uniform bushings then becoming sufficiently higher so as to minimize "steer" of the suspension.

Figure 6:
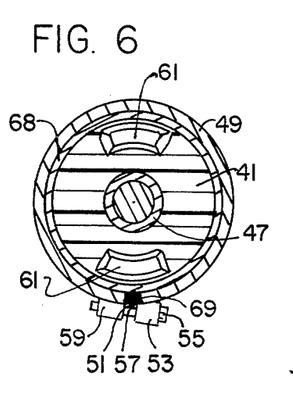
FIG. 6 is a side sectional view of the elastomeric bushing used in FIG. 5.
Figure 7:
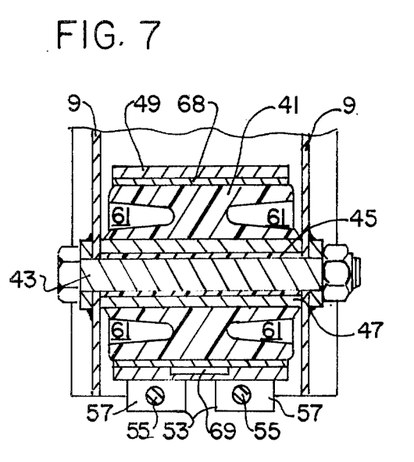
FIG. 7 is an end sectional view of the pivot connection of FIG. 5.
Figure 8:
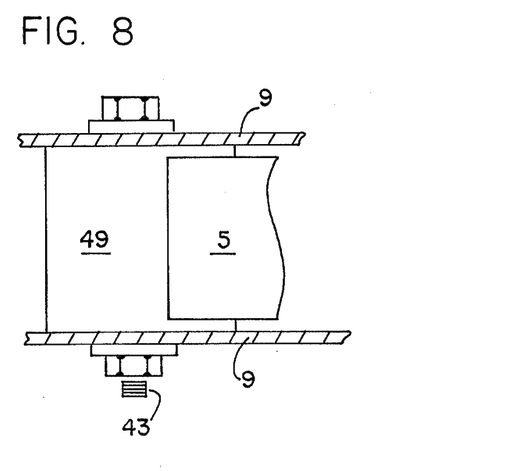
FIG. 8 is a top plan view of the pivot connection of FIG. 5.

These characteristics and limits are also true of and achievable in the following two other embodiments of elastic means 21 as further illustrated in the drawings:

FIGS. 5–8 illustrate a particularly preferred embodiment of elastic means 21. In this embodiment there is a single large elastomeric device 41 located at pivot connection 35. Device 41 is held in place by pivot pin 43, plastic liner 45, metal inner sheath 47, outer ring 68 and retaining ring 49. Orientation lug 69 is provided, as illustrated in FIGS. 6–7 to insure proper location of the device 41 as described hereinafter. Plastic liner 45 may be a conventional plastic liner such as a Derlin plastic liner manufactured by Cardinal Industries. Its purpose is to prevent inner metal sheath 47 from adhering to pin 43. Sheath 68 is optional and may be eliminated if desired.

The replacement process as well as initial installation of device 41 is further facilitated by the nature of retaining ring 49. As illustrated, ring 49 is not a continuous ring, but terminates in a gap 51. Gap 51 is shortened by screw clamp 53 comprised of a pair of screws 55 retained on one side of gap 51 by screw holders 57 and on the other side of the gap by threaded retainer 59. Nuts may optionally be used in place of retainer 59. In this way, tightening of screws 55 draws holders 57 toward their respective retainers 59. Since each are connected to ring 49 on respective ends of gap 51, gap 51 is pulled closed thus, pinching in and tightly securing bushing 41 in ring 49. Removal of screw 55 allows the elastomeric device 41 to be easily removed and replaced with a new one within ring 49. To complete the structure as illustrated, pin 43 is held in place by conventional nut means since pin 43 itself is the bolt. Beam 5 is welded to the outer surface of ring 49.

FIGS. 6–7 are a typical example of the relative dimensions and the sizes of the parts in certain preferred embodiments. When used in axle suspensions for trailers having a GAWR of about 18,000 lbs. or more (e.g. up to about 25,000 lbs.), conventional bushing material having durometers of about 50–75 may be used for bushing 41, while cavities 61 are the relative and actual (¼ scale as filed) size indicated, thereby to give markedly different deflections beamwise than hangerwise and spring rates in the horizontal vs. vertical directions.

Roll stability, steer, and braking characteristics are also excellent, as is durability. Economy is thus achieved, particularly given, not only the long life of the elastomeric device 41, but its easy and fast replacement should it wear out. The distance between axle and hanger remains substantially constant during operation.

Given the usual long hauler commercial trailer situation, e.g. 18,000-25,000 GAWR, if the dimensions of FIGS. 6-7 as filed herewith are taken as one-quarter scale, and durometers are about 50-70, the maximum deflections typically are 0.19" BW and 1.25" HW, while the spring rates are about 25,000 lbs./in. vertical and 50,000 lbs./in. horizontal. The vertical rate controls the vehicle roll to approximately 3 degrees and the higher horizontal rate and substantially lower horizontal force maintains axle tracking and limits steer. This combination of specifically tailored rates providing stable, safe vehicle handling without the use of highly stress components.

In certain preferred embodiments of the elastic means 21 of FIGS. 5-8, ring 49 is capable of being drawn sufficiently tight about device 41 and sleeve 47 is retained at its ends securely by tension in bolt 43 acting on hanger 9 so that no rotation about pivot pin 33 occurs during operation of suspension 1. In other words, all pivotal or nonsliding rotational movement about pin 33 is within the bushing (elastomeric element) 41 isself.

As discussed above, and as best illustrated in FIGS. 6-7 lug 69 is used to orient device 41 properly such that the cavities 61 are properly aligned thereby to give the desired deflections. This is accomplished by using gap 51 as the locus for lug 69. Since ring 49 is permanently retained by its connection to beam 5, gap 51 is established correctly during manufacturing. Such reduces greatly the chance of error during assembly or repair.

Figure 9:
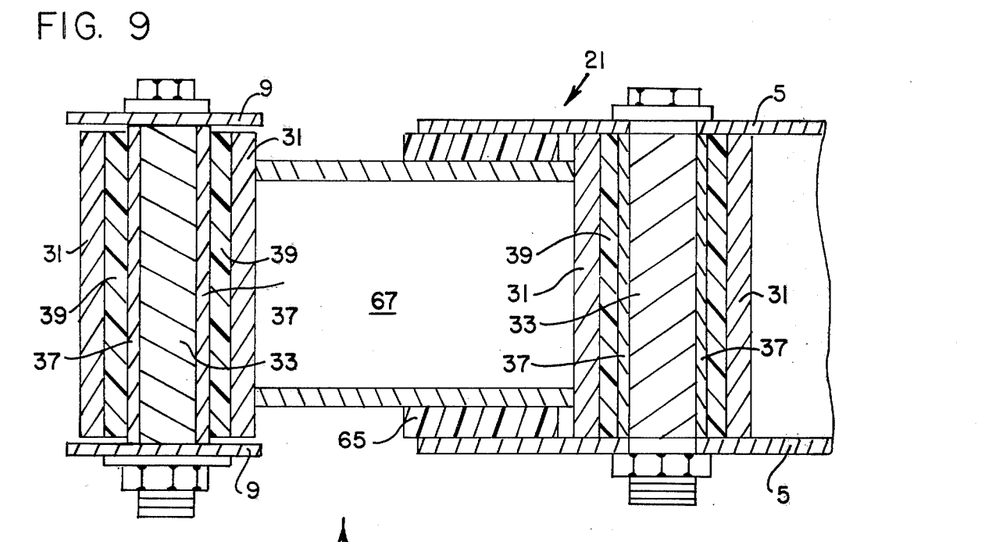
FIG. 9 is a top sectional view of another embodiment of this invention.
Figure 10:
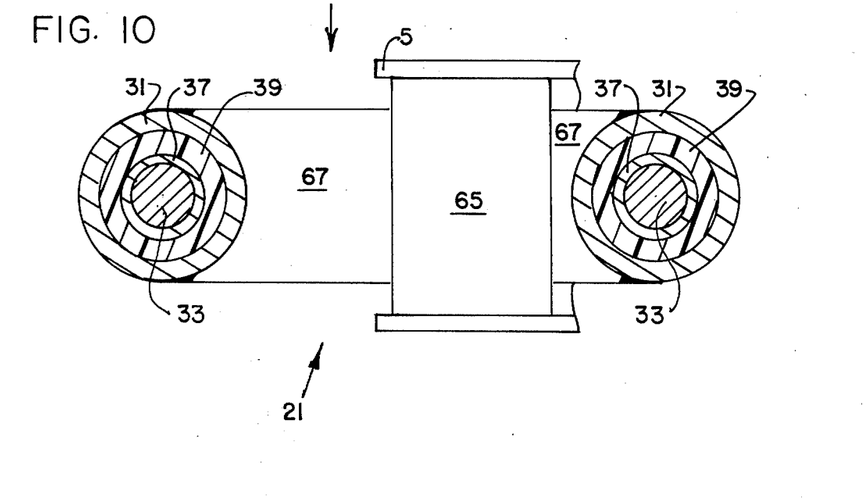
FIG. 10 is a side plan, partially sectionalized view of FIG. 9.

FIGS. 9-10 illustrate yet another embodiment of this invention. Elastic means 21 in these Figs. may be used in place of elastic means 21 in FIGS. 1-4, using the same type of beam 5. In this respect, this embodiment differs from the first one primarily in the replacement of the middle pin 31 and bushing arrangement with a different structure. Generally speaking, the other parts are the same and have thus, been similarly numbered as in FIGS. 1-4.

The different structure employed herein is generally illustrated at 63. Structure 63 is comprised of a tubular elastic member 65 which in turn is bonded to inner metal connecting tube 67. Bushing 65 is surrounded and abuts against the walls of beam 5, thus, to provide a true bushing circumferential (inwardly) to the beam. In this way, the different deflections BW vs. HW and spring rates, horizontal vs. vertical are achieved. In addition, roll rates are established at satisfactory limits and the pivot point does not move substantially with respect to the axle connection means (i.e. the distance therebetween is maintained as substantially constant). More specifically, by selecting the proper elastomeric hardness, thickness, length and spacing for any given system, the desired effective vertical rate can be achieved and vehicle roll can be limited or controlled to 3 degrees or as needed.

I claim:

1. In an axle suspension system comprising an elongated, substantially rigid beam, a pneumatic bellows located at one end of the beam, a hanger bracket located at the other end of the beam, means for pivotally connecting the hanger bracket to the beam and means for connecting an axle to the beam located intermediate the ends of the beam, the improvement comprising, means for rigidly connecting said axle connecting means to said beam, said axle connecting means being capable of being rigidly connected to the axle thereby forming a rigid axle to beam connection, and an elastic means having a different degree of deflection beamwise than hangerwise, said elastic means being located at a spaced distance from said axle connecting means in the path of articulation forces between the beam and hanger bracket and being sufficiently resilient to allow operative deflections in response to said articulation forces and at the same time restrain longitudinal movement sufficiently to maintain substantially constant the distance between the hanger bracket and the axle connecting means.

2. The suspension of claim 1 wherein the elastic means is contiguous to the hanger bracket.

3. The suspension of claim 2 wherein the elastic means has a different spring rate in the vertical than in the horizontal.

4. The suspension of claim 3 wherein the hangerwise deflection of the elastic means is greater than the beamwise deflection and the spring rate in the vertical is less than in the horizontal.

5. The suspension according to claim 4 wherein the means for pivotally connecting the hanger bracket and the beam includes a retaining pin transverse to the direction of the elongated beam and connected to said hanger bracket, a tubular metal cylinder in which said pin non-rotatably resides and wherein said elastic means comprises an elastic tubular element, the inner surface of which is securely held to said metal cylinder such that substantially all pivotal movement about said pin is within the elastic element.

6. The suspension of claim 2 wherein said means for pivotally connecting the hanger and beam includes a pivot connection attached to the hanger and said elastic means comprises an element having a different degree of deflection beamwise than hangerwise.

7. The suspension of claim 6 wherein the hanger bracket comprises two transversely spaced plates and said means pivotally connecting the beam and the hanger bracket comprises a retaining pin extending between and connected to the plates, said elastomeric element extending around said pin and being of tubular shape, said element being held securely with respect to said pin such that substantially all pivotal movement about said pin is within the elastomeric element.

8. The suspension of claim 7 wherein said tubular elastomeric element is thick walled, and the face of each wall at either end of said element is provided with at lease one cavity capable of providing a lesser degree of deflection beamwise than hangerwise in said element.

9. The suspension of claim 8 wherein there are two cavities in each face of said elastomeric element spaced at a vertical distance from said retaining pin thereby to provide a greater degree of deflection hangerwise than beamwise and a greater spring rate in the horizontal than in the vertical direction.

10. The suspension of claim 6 wherein said elastomeric element is held securely with respect to said pin by means including a retaining ring adjustable with respect to its diameter and means for adjusting the diameter of said ring, said ring being removable from said element by enlarging the diameter thereof and being capable of tightly securing said element with respect to said pin by shortening the diameter thereof.

11. The suspension of claim 10 which further includes a metal sleeve positioned between said pin and said elastomeric element, said element being slidably removable from said sleeve.

12. The suspension of claim 2 wherein said elastic means comprises at least one elastomeric element longitudinally spaced from the hanger bracket in the direction of the beam.

13. The suspension of claim 12 wherein said hanger bracket is comprised of two transversely spaced plates and the means for pivotally connecting the hanger and the beam comprises a pivotal connection located between the two plates and is attached thereto and wherein the beam to which the hanger is connected extends to a point longitudinally adjacent said hanger, the suspension further comprising means for connecting the beam to the pivotal connection.

14. The suspension of claim 13 wherein said pivotal connection comprises a retaining pin transverse to the direction of the elongated beam and connected to said hanger bracket, a tubular metal cylinder in which said pin non-rotatably resides and wherein said elastic means further comprises an elastic tubular element, the inner surface of which is bonded to said metal cylinder.

15. The suspension of claim 14 wherein said at least one elastomeric element longitudinally spaced from the hanger bracket is attached to the beam by a retaining pin connected to said beam and tubular metal cylinder in which said pin non-rotatably resides, and said elastomeric element is a tubular element bonded to said metal cylinder.

16. The suspension of claim 15 wherein there are at least two elastomeric elements longitudinally spaced from the hanger bracket, at least one of which is a tubular cylinder attached to the beam by said retaining pin and tubular metal cylinder.

17. The suspension of claim 16 wherein at least two of said elastomeric elements longitudinally spaced from the hanger bracket are tubular cylinders and attached to the beam by a said retaining pin and tubular metal cylinder.

18. The suspension of claim 17 wherein said means for connecting the beam to the pivotal connection comprises a walled member extending longitudinally beamwise, said elastomeric elements longitudinally spaced from the hanger bracket are transversely attached to said walled member.

19. The suspension of claim 18 wherein said pivotal connection is transversely attached to said walled member.

20. The suspension of claim 19 wherein said walled member comprises two substantially parallel side walls and said pivotal connection and said elastomeric elements longitudinally spaced from the hanger are transversely attached to said side walls by a transversely extending metal cylinder the inner surface of which is in contact with the outer surface of the elastic tubular element.

21. The suspension of claim 12 wherein said elastomeric element is connected directly to the beam.

22. The suspension of claim 21 wherein said beam is a hollow member defined by top, bottom and side walls and said elastomeric element is a hollow member the outer dimensions of which generally conform to the inner dimensions of the hollow beam.

23. The suspension of claim 22 wherein the means for pivotally connecting the hanger and the beam comprises a pivotal connection located at the hanger bracket, the suspension further comprising a walled member extending between the beam and the pivotal connection, said hollow membered elastomeric element extending around said walled member and being located between the walled member and the beam.

24. The suspension of claim 23 which further includes an additional elastomeric element spaced from the hanger bracket at a further distance from said hollow membered elastomeric element.

* * * * *

REEXAMINATION CERTIFICATE (2246th)
United States Patent [19]
Van Denberg

[11] B1 4,166,640
[45] Certificate Issued Mar. 22, 1994

[54] AXLE SUSPENSION FOR WHEELED VEHICLES

[75] Inventor: Ervin K. Van Denberg, Muskegon, Mich.

[73] Assignee: Boler Company, Inc., Itasca, Ill.

Reexamination Request:
No. 90/002,823, Aug. 26, 1992

Reexamination Certificate for:
Patent No.: 4,166,640
Issued: Sep. 4, 1979
Appl. No.: 896,129
Filed: Apr. 14, 1978

[51] Int. Cl.$^5$ .............................. B60G 13/02
[52] U.S. Cl. ...................... 280/711; 267/270; 267/271
[58] Field of Search ............... 267/31, 67, 258, 293, 267/141.1, 270, 271; 280/711, 712, 713, 702

[56] References Cited
U.S. PATENT DOCUMENTS

| | | | |
|---|---|---|---|
| 3,434,707 | 3/1969 | Raidel | 267/31 |
| 3,801,086 | 4/1974 | Raidel | 267/67 |
| 3,976,338 | 8/1976 | Trachte et al. | 308/26 |

FOREIGN PATENT DOCUMENTS

863720 3/1961 United Kingdom .

OTHER PUBLICATIONS

"Automotive Design Engineering" Magazine, Nov. 1963 issue, p. 76.
"Ridewell Corporation" Drawing No. SK-550D-SP., Date May 9, 1974.
"Ridewell Corporation" Sales Invoice No. 11956, Dated Aug. 20, 1974.
"Ridewell Corporation" Sales Invoice No. 017422, Dated Dec. 27, 1977.
Fruehauf "Cargo Care Air Ride Suspension", made of record in U.S. Pat. No. 4,166,640 as paper No. 2.

*Primary Examiner*—Margaret A. Focarino

[57] ABSTRACT

An axle suspension particularly applicable to trailers includes an elongated, substantially rigid beam, a pneumatic bellows located at one end of the beam, a hanger bracket located at the other end of the beam, an axle connecting means rigidly connected to the beam and axle, and an elastomeric bushing structure located at or near the pivot connection between hanger bracket and beam which has a different degree of deflection beamwise than hangerwise, is sufficiently rigid to provide suspension stability and is sufficiently resilient to allow operative deflections in response to articulations of the suspension to maintain substantially constant the distance between the hanger bracket and the axle connecting means.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, lines 43-47:
In certain preferred embodiments the elastic means includes an elastomeric bushing arrangement located at or near the hanger-to-beam pivot connection. Such suspensions find unique application with non-powered axles and particularly as axle suspensions for [tailers] *trailers.*

Column 3, lines 15-28:
With reference to FIG. 1 there is illustrated a trailing arm suspension 1 connected to a trailer frame member 3. Suspension 1 includes a rigid trailing beam 5, airbag 7 at one end of beam 5, and hanger bracket 9 at the other end. Suspension 1 may be optionally provided with a conventional shock absorber (not shown) extending between beam 5 and frame 3. Located intermediate the ends of beam 5 is axle connection means 11. Means 11 are rigidly connected to beam 5 by U-bolts 13. Axle 15 resides in saddle members 17 and is welded via welds 19 to [U-bolts 13] *saddle 17.* In this way axle 15 is rigidly connected to beam 5. Other means 11, such as those conventionally employed in the art may be used provided that they rigidly secure beams 5 to the axle 15.

Column 3, line 38-51:
The actual absolute (i.e. specific) values of deflection and rates will vary depending upon several factors, the achievement of a difference being the generic consideration. For example, depending upon such considerations as type of vehicle, load to be carried, need for stability vs. ride comfort, geographical location to be driven over, and the like. Generally speaking, for this and the other embodiments hereinafter described, and when used for suspensions on trailers of the "tractor-trailer" type wherein the suspension is certified at about 18,000 lbs. or more GAWR, deflections per side on the order of about 0-0.19" for BW and about [1.63] *0.63*-1.25" for HW with a ratio per side of BW:HW of about 1:2 to 1:8 will usually achieve the desired results of this invention.

Column 3, line 62-Column 4, line 17:
Each pin 33 is encased in a metal sheath 37. Elastomeric bushings 39 are formed of material which is chemically bonded to the inner metal sheath 37 forming a Robertson type bushing. Bushings 39 are then pressure fit into rings 31. In preferred embodiments, sheath [38] *37* is secured tightly by bolt 33 so that it does not rotate on pin 33, particularly at the pivot connection 35, such that virtually all pivotal movement about pin 33 (i.e. at least at the pivot pin 33) is within bushing 39. These bushings may be made of conventional elastomeric bushing material heretofore used for the bushings in the prior art. They may all be of substantially the same dimensions. However, because of the arrangement here shown of a series of [bushing] *bushings,* rather than just a single one, located at or immediately adjacent the pivot connection, unique features are achieved. For example, in this way, the elastic means 21 has a different degree of deflection BW than HW, a different vertical than horizontal spring rate and is sufficiently resilient to allow operative deflections in response to articulation forces and at the same time is sufficiently rigid to restrain longitudinal movement thereby to maintain substantially constant the distance between the hanger bracket 9 and the axle connecting means 11.

Column 4, lines 27-39:
FIGS. 5-8 illustrate a particularly preferred embodiment of elastic means 21. In this embodiment there is a single large elastomeric device 41 located at pivot connection 35. Device 41 is held in place by pivot pin 43, plastic liner 45, metal inner sheath 47, outer ring 68 and retaining ring 49. Orientation lug 69 is provided, as illustrated in FIGS. 6-7 to insure proper location of the device 41 as described hereinafter. Plastic liner 45 may be a conventional plastic liner such as a [Derlin] *Delrin* plastic liner manufactured by Cardinal Industries. Its purpose is to prevent inner metal sheath 47 from adhering to pin 43. Sheath 68 is optional and may be eliminated if desired.

Column 5, lines 7-19:
Given the usual long hauler commercial trailer situation, e.g. 18,000-25,000 GAWR, if the dimensions of FIGS. 6-7 as filed herewith are taken as one-quarter scale, and durometers are about 50-70, the maximum deflections typically are 0.19" BW and 1.25"HW, while the spring rates are about 25,000 lbs./in. vertical and 50,000 lbs./in. horizontal. The vertical rate controls the vehicle roll to approximately 3 degrees and the higher horizontal rate and substantially lower horizontal force maintains axle tracking and limits steer. This combination of specifically tailored rates providing stable, safe vehicle handling without the use of highly [stress] *stressed* components.

Column 5, lines 20-27:
In certain preferred embodiments of the elastic means 21 of FIGS. 5-8, ring 49 is capable of being drawn sufficiently tight about device 41 and sleeve 47 is retained at its ends securely by tension in bolt 43 acting on hanger 9 so that no rotation about pivot pin 33 occurs during operation of suspension 1. In other words, all pivotal or nonsliding rotational movement about pin 33 is within the bushing (elastomeric element) 41 [isself-] *itself.*

The drawing figure(s) have been changed as follows:

Reference numeral 11, new line below numeral 17, and new arrowhead at end of numeral 21 has been added to FIG. 1.

Reference numeral 23 has been added to FIG. 2.

Reference numeral 45 has been added to FIG. 6.

AS A RESULT OF REEXAMINATION, IT HAS BEEN DETERMINED THAT:

Claim 1 is cancelled.

Claims 2, 6, 8, 10, 11 are determined to be patentable as amended.

Claims 3-5, 7, 9, 12-24 dependent on an amended claim, are determined to be patentable.

New claim 25 is added and determined to be patentable.

2. [The] *In an axle* suspension [of claim 1 wherein the elastic means is] *system comprising an elongated, substantially rigid beam, a pneumatic bellows located at one end of the beam, a hanger bracket located at the other end of the beam, means for pivotally connecting the hanger bracket to the beam and means for connecting an axle to the beam located intermediate the ends of the beam, the improvement comprising, means for rigidly connecting said axle connecting means to said beam, said axle connecting means being capable of being rigidly connected to the axle thereby forming a rigid axle-to-beam connection, and an elastic means having a different degree of deflection beamwise than hangerwise, said elastic means being located contiguous to the hanger bracket and at a spaced distance from said axle connecting means in the path of articulation forces between the beam and hanger bracket and being sufficiently resilient to allow operative deflections in response to said articulation forces and at the same time restrain longitudinal movement sufficiently to maintain substantially constant the distance between the hanger bracket and the axle connecting means.*

6. The suspension of claim 2 wherein said means for pivotally connecting the hanger and beam includes a pivot connection attached to the hanger and said elastic means comprises an *elastomeric* element having a different degree of deflection beamwise than hangerwise.

8. The suspension of claim 7 wherein said tubular elastomeric element is thick walled, and the face of each wall at either end of said element is provided with at [lease] *least* one cavity capable of providing a lesser degree of deflection beamwise than hangerwise in said element.

10. The suspension of claim [6] *9* wherein said elastomeric element is held securely with respect to said pin by means including a retaining ring adjustable with respect to its diameter and means for adjusting the diameter of said ring, said ring being removable from said element by enlarging the diameter thereof and being capable of tightly securing said element with respect to said pin by shortening the diameter thereof.

11. The suspension of claim 10 which further includes a [metal] *plastic* sleeve positioned between said pin and said elastomeric element, said element being slidably removable from said sleeve.

*25. In an axle suspension system comprising an elongated, substantially rigid beam, a pneumatic bellows located at one end of the beam, a hanger bracket located at the other end of the beam, means for pivotally connecting the hanger bracket to said other end of the beam and means for connecting an axle to the beam located intermediate the ends of the beam, the improvement comprising, means for rigidly connecting said axle connecting means to said beam, said axle connecting means being capable of being rigidly connected to the axle thereby forming a rigid axle-to-beam connection, and an elastic means having a different degree of deflection beamwise than hangerwise, said elastic means being located at said other end of said beam and at a spaced distance from said axle connecting means in the path of articulation forces between the beam and hanger bracket and being sufficiently resilient to allow operative deflections in response to said articulation forces and at the same time restrain longitudinal movement sufficiently to maintain substantially constant the distance between the hanger bracket and the axle connecting means.*

* * * * *